S. REMONTET.
AUTOMATIC DOOR CLOSER.
APPLICATION FILED MAY 27, 1907.
900,956.
Patented Oct. 13, 1908.
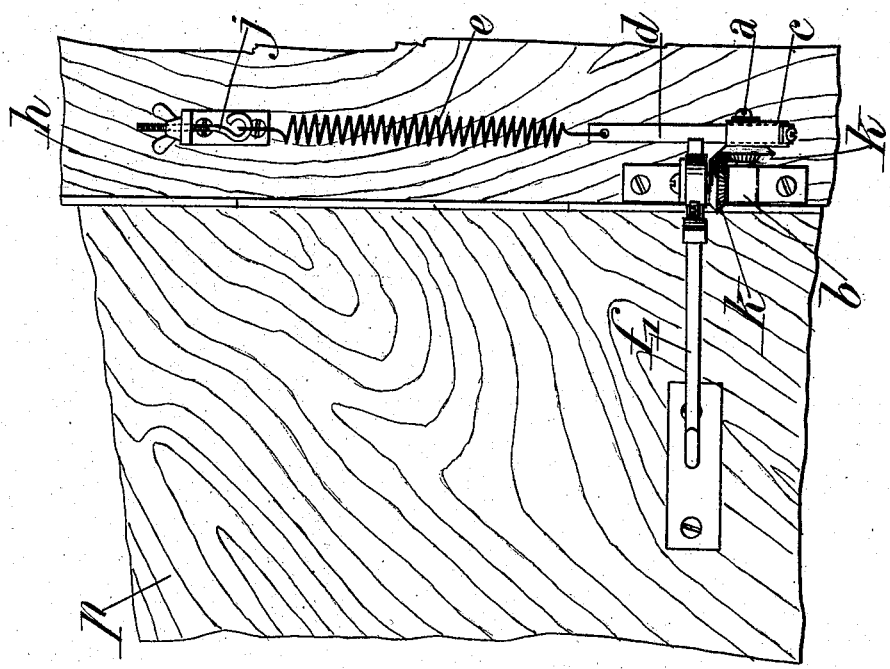
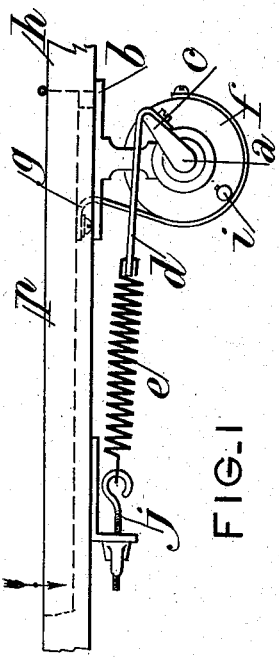
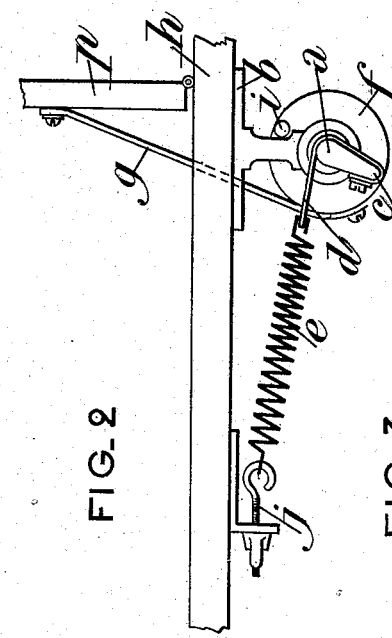
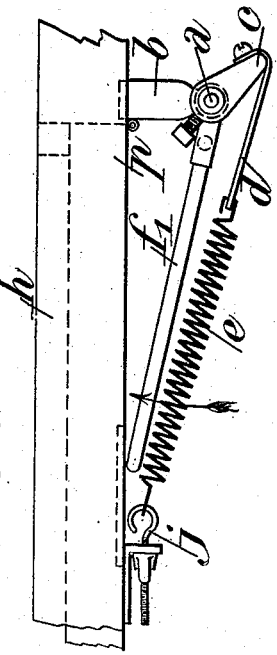
WITNESSES
INVENTOR

UNITED STATES PATENT OFFICE.

STÉPHANE REMONTET, OF LAGRESLE, FRANCE.

AUTOMATIC DOOR-CLOSER.

No. 900,956.   Specification of Letters Patent.   Patented Oct. 13, 1908.

Application filed May 27, 1907. Serial No. 375,918.

*To all whom it may concern:*

Be it known that I, STÉPHANE REMONTET, a citizen of the French Republic, residing at Lagresle, Loire, in France, have invented a certain new and useful Automatic Door-Closer, of which the following is a specification.

The present invention relates to an automatic door-closing device adapted to act on the door with varying force, the maximum of which occurs towards the end of the closing movement.

The device comprises in the main an axle fixed to the frame of the door and carrying two levers one of which is of a constant effective length, and acts on the door, the other lever being of variable effective length and connected with a spring.

Several constructions embodying the invention are shown in the annexed drawing.

Figure 1 is a plan-view showing the door-closer placed above the door at the side opposite to that towards which the door opens. Fig. 2 shows the same device with the door open. Fig. 3 shows the device placed above the door at the side towards which the door opens. Fig. 4 shows the device connected to one of the lateral uprights of the door-frame.

Figs. 1 and 2 illustrate the principle of the invention: A vertical axle $a$ turns in a bearing $b$ fixed at the upper part of the door-frame $h$; to this axle is fixed a crank arm $c$ connected by a strap $d$ with a spring $e$, one end of which is hooked to an adjustable support $j$ also fixed to the frame of the door. To the same axle $a$ is fixed a circular plate $f$, to the periphery of which is attached one end of a strap $g$, the other end of the latter being attached to the door, $p$. The crank arm $c$ is fixed to the axle in such a manner that it affords the greatest leverage when the door $p$ is closed, (Fig. 1) and the smallest leverage when the door is open (Fig. 2), while on the other hand, the door always acts on the same lever-arm, which in this case, is the radius of the plate $f$. The result is that when the open door is released it moves slowly at first, during the greater part of its course, and that towards the end of its course, the effective radius of the crank arm increases suddenly, so that the closing of the door is insured.

If, for any reason the closing device is to be put out of action, a pin or peg $i$ is inserted into a hole in the plate $f$, when the door is open, and this pin abuts against the support or bearing $b$ as shown in Fig. 2, and prevents the rotation of the plate by the spring. The door can then be opened and closed in the ordinary way.

If the door-closer is placed at the side towards which the door swings (Fig. 3) the crank arm $c$ is also fixed to the axle in such a manner that it always affords the greatest leverage when the door is closed, and a lever $f^1$, acting directly on the door is used instead of the strap $g$ and disk $f$ shown in Figs. 1 and 2. It is obvious that the same effects are obtained.

If the door-closer is connected to one of the lateral uprights of the door-frame, as shown in Fig. 4, the crank arm $c$, may be fixed to a horizontal axle $a$ and may act on the door by means of a lever-arm $f^1$ and a pair of bevel wheels $k$, the movement being similar to that described with reference to Figs. 1 to 3.

Similar arrangements enable the device to be used under all possible conditions.

The spring $e$ may be a helical spring as illustrated.

What I claim as my invention and desire to secure by Letters Patent of the United States is:—

A door closing device comprising a bracket secured to the door casing, an axle mounted in said bracket, a crank arm on the axle, an adjustable spring connected with the crank arm, a disk on the axle, and a strap having one end connected to said disk and the other end connected to the door, said crank arm being fixed to the axle in such a manner that it affords the greatest leverage when the doors close and the smallest leverage when the doors open.

In witness whereof I have signed this specification in the presence of two witnesses.

STÉPHANE REMONTET.

Witnesses:
 LYONNARD,
 LOUIS INPRÉLO.